United States Patent
Takeishi

(10) Patent No.: US 8,189,242 B2
(45) Date of Patent: May 29, 2012

(54) APPARATUS AND METHOD FOR GENERATING IMAGE DATA FOR FORMING A VISIBLE IMAGE

(75) Inventor: Hiroki Takeishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 11/570,705

(22) PCT Filed: Aug. 31, 2006

(86) PCT No.: PCT/JP2006/317694
§ 371 (c)(1),
(2), (4) Date: Dec. 15, 2006

(87) PCT Pub. No.: WO2007/026953
PCT Pub. Date: Mar. 8, 2007

(65) Prior Publication Data
US 2008/0273212 A1    Nov. 6, 2008

(30) Foreign Application Priority Data

Sep. 1, 2005    (JP) ................................ 2005-254005

(51) Int. Cl.
*G03F 3/08*    (2006.01)
(52) U.S. Cl. ........ 358/518; 358/1.9; 358/3.26; 358/538; 382/163; 382/167
(58) Field of Classification Search .................. 358/1.9, 358/3.26, 518, 538; 382/163, 167
See application file for complete search history.

(56) References Cited

U.S. PATENT DOCUMENTS

| 5,666,543 | A  * | 9/1997  | Gartland ........................ 715/205 |
| 5,668,931 | A  * | 9/1997  | Dermer ........................... 358/1.4 |
| 6,345,117 | B2 * | 2/2002  | Klassen ......................... 382/167 |
| 6,459,501 | B1 * | 10/2002 | Holmes .......................... 358/1.9 |
| 6,594,030 | B1 * | 7/2003  | Ahlstrom et al. ............ 358/1.15 |
| 7,088,469 | B1 * | 8/2006  | Sanger et al. ................. 358/1.9 |
| 7,164,498 | B2 * | 1/2007  | Van Bael ....................... 358/1.9 |
| 2001/0033686 | A1 | 10/2001 | Klassen .......................... 15/314 |
| 2003/0053098 | A1 * | 3/2003 | Hagai et al. .................... 358/1.9 |
| 2003/0063301 | A1 | 4/2003 | Klassen ......................... 358/1.9 |
| 2003/0090689 | A1 | 5/2003 | Klassen ......................... 358/1.9 |
| 2005/0219593 | A1 * | 10/2005 | Hoshino ..................... 358/1.13 |

FOREIGN PATENT DOCUMENTS

| EP | 0 996281 A2 | 10/1999 |
| JP | 2000-165693 A | 6/2000 |
| JP | 2000-165694 A | 6/2000 |
| JP | 2000-196906 A | 7/2000 |
| JP | 2005-92307 A | 4/2005 |

* cited by examiner

*Primary Examiner* — King Poon
*Assistant Examiner* — Jamares Q Washington
(74) *Attorney, Agent, or Firm* — Fitzpatrick, Cella, Harper & Scinto

(57) ABSTRACT

In forming an image including a spot color, when an image for which a trapping process is performed does not include information of a spot color, the trapping process sometimes functions ineffectively. To solve this problem, image data having information of colors less in number than the colors included in the image is input and two adjacent regions are detected from the input image data. When the color information is color-separated into the colors, it is determined if the two regions share the color, and trapping for an adjacent portion of the two regions is controlled.

5 Claims, 22 Drawing Sheets

F I G. 8
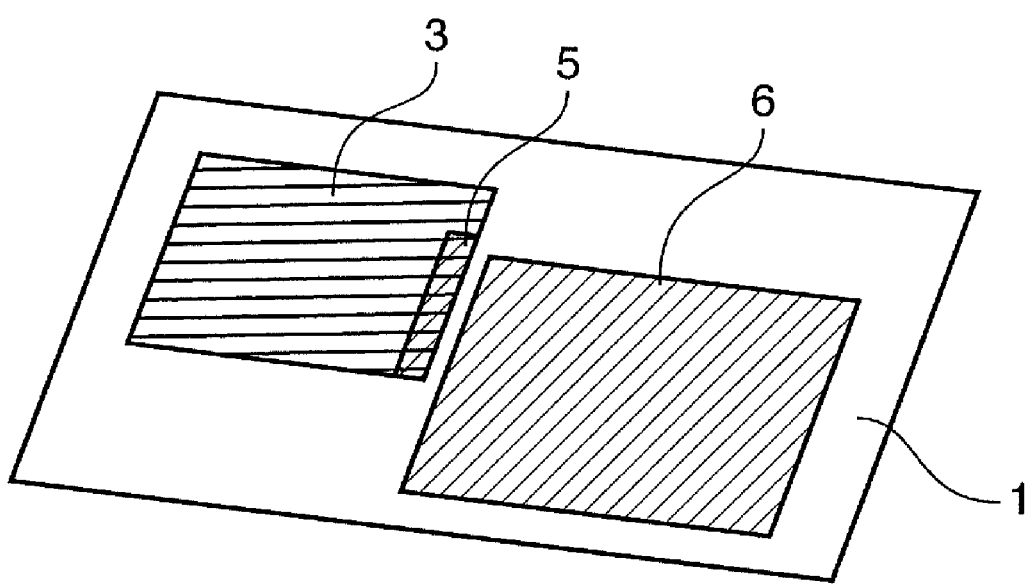

APPARATUS AND METHOD FOR GENERATING IMAGE DATA FOR FORMING A VISIBLE IMAGE

TECHNICAL FIELD

The present invention relates to image processing for generating image data for forming a visible image by overlaying a plurality of colors.

BACKGROUND ART

An image forming apparatus such as an electrophotographic laser beam printer, copying machine, multi-functional peripheral equipment, and the like uses a powder color material or liquid color material (to be referred to as toner or ink) to form a visible image on a printing medium.

For example, an electrophotographic image forming apparatus performs laser scanning on the surface of a charged image carrier and exposes it in accordance with image data, thereby forming an electrostatic latent image. The apparatus then supplies color materials to the image carrier to develop the electrostatic latent image, and transfers and fixes the developed image on a printing medium to form a visible image on it.

A printing machine other than the electrophotographic one also forms a desired visible image by overlaying a plurality of colors on a printing medium on the basis of image data.

Image data for forming a visible image is obtained by converting a document image into digital data by an image scanning apparatus. The image data is input to the image forming apparatus or printing machine through an image processing apparatus (work station or personal computer) or apparatus having an image processing function which is connected to the image forming apparatus or printing machine. Image data for forming a visible image may be generated by a work station or personal computer.

[Generation of Colors]

Most printing machines or image forming apparatuses perform a printing process by using four-color image data of cyan (C), magenta (M), yellow (Y), and black (K). These four colors are used because they have high affinities for forming an image since color reproduction on a printing medium is based on a subtractive process. In addition, the colors of the color materials (ink or toner) are generally these four colors. That is, color information of image data for forming a visible image and that of image data processed by the work station, personal computer, or apparatus having the image processing function described above are often expressed by these four colors.

Recently, the image forming apparatus has achieved various improvements in order to meet a demand for a high-quality image represented by an image having silver halide photo quality. A printing machine sometimes uses spot colors such as fluorescent colors, and the spot colors have also been used in image forming apparatuses other than the printing machine.

For example, in order to improve tone, spot color materials are used which are obtained by making CMYK lighter and called light color materials. Alternatively, spot colors called dark color materials can be used. In another example, a color material having a hue other than CMYK is used as a spot color material to widen the gamut of formable images and achieve a high-quality image. In this manner, the image forming apparatus forms a high-quality visible image using the spot colors.

However, color information about spot colors may not exist in image data for forming a visible image in some cases. More specifically, image data for forming a visible image has CMYK color information and the like, but may not have information about spot colors.

Image data for forming a visible image is generally page description language (PDL) format data (to be referred to as "PDL data" hereinafter). When an image forming apparatus forms a visible image, PDL data is input to the image forming apparatus. Mostly PDL data has CMYK color information and the like in the same manner as text data, graphic data, etc., but has no color information about spot colors. Therefore, in general, an image processing apparatus included in an image forming apparatus separates CMYK information into CMYK colors and spot colors.

FIGS. 1 to 3 are graphs for explaining generation of colors for forming an image.

When the colors are generated from color information from the input PDL data (that is, when CMYK information is input to generate CMYK colors), as illustrated by a curve 101 in FIG. 1, the density of the corresponding color can be increased in accordance with an increase in the density of the color information of the input PDL data. FIG. 1 shows the relationship between the input and output densities for one color. However, colors other than the colors included in the color information of the input PDL data are to be generated, as illustrated in FIGS. 2 and 3, for example, the densities of two or more colors are determined on the basis of the color information of one color. For example, a curve 101' in FIG. 2 represents density reproduction by a light color material having low density, and a curve 102' represents density reproduction by a dark color material having high density. Examples of light and dark colors of the same color system are light cyan and dark cyan, and light magenta and dark magenta. Printing using the light color material 101' is performed in an input density range between 0 to a neighborhood of an input density 104, and printing using the dark color material 102' is performed in an input density range of the input density 104 and more. Accordingly, in FIG. 2, an input density range, where the light color material and the dark color material are mixed, is very narrow or is not existence.

FIG. 3 is a graph showing density reproduction by dark and light color materials of another type. A curve 101" in FIG. 3 represents density reproduction by the dark color material, and a curve 102" represents density reproduction by the light color material of the same color system as the dark color material. As the input density increases from 0, printing using the light color material 102" is performed, and printing using the dark color material 101" is started from an input density 103. In FIG. 3, the input density range, where the light color material and the dark color material are mixed, is broader than that of the graph shown in FIG. 2.

[Trapping Process]

Many methods for processing image data have been employed in obtaining high quality image, e.g., PDL data, for forming a visible image, or processing intermediate data obtained by converting the image data. One example is known as a trapping technique. A trapping technique suppresses reductions in the quality of a visible image caused by misregistration of a color which, in turn, occurs due to an imperfect arrangement of the color, imperfect visible image formation, imperfect transportation of a recording medium, or the like. For example, Japanese Patent Laid-Open No. 2000-165694 describes details of this technique.

FIGS. 4 to 8 are views which help explain a trapping process.

An image 1 shown in FIG. 4 includes regions 2 and 3 formed by different colors. When image data representing the image 1 is input, the regions of the image 1 are extracted and a new region (trap region 4 shown in FIG. 5) is generated near the boundary of the two regions 2 and 3. Color information is generated so that the trap region 4 shares the color of the two regions 2 and 3.

FIG. 6 shows a case wherein no trapping process is performed. When misregistration of the color of a region 12 occurs, the background color of a printing medium shows itself (a so-called "blank portion" appears) between the regions 12 and 8. This causes a reduction in the quality of the visible image. FIG. 7 shows a case wherein a trapping process is performed. Even when misregistration of the color of a region 12 occurs, no blank portion readily appears owing to a trap region 13 and a reduction in the quality of the visible image can be prevented.

This trapping process is performed on image data having CMYK color information such as PDL data and intermediate data obtained by converting the PDL data, and it prevents the reduction in quality of a visible image caused by misregistration.

[Trapping Process and Color Generation]

Color information of image data to be processed by a trapping process is generally expressed using CMYK. However, the image forming apparatus sometimes forms a visible image using colors including spot colors other than CMYK. For this reason, when generating colors from trapping-processed image data having CMYK color information, a color contrary to the purpose of the trapping process may be generated.

For example, a change in the color information of cyan (C) by the trapping process may not be reflected in the density of the color of cyan (C). In this case, the effect sought through use of the trapping process cannot be achieved sufficiently. For example, assume that a trapping process is performed on the image data of the image 1 shown in FIG. 4 and a trap region sharing the color (e.g., cyan (C)) of regions 2 and 3 is generated. After this trapping process, for example, the color (C) of the region 2 is separated, the value of the color (C) becomes 0, and the color (C) is separated into colors green (G) and magenta (M) serving as spot colors. In this case, the trap region and region 3 share the same color (C), but the trap region and region 2 do not share the same color (C), therefore the density sought through the use of the trapping process is not reflected in the color. As a result, as shown in FIG. 8, a trap region 5 does not share the color of a region 6 which is the spot color corresponding to the region 2. When misregistration of the color forming the region 6 occurs in this state, a blank portion appears.

DISCLOSURE OF INVENTION

The first aspect of the present invention discloses an image processing apparatus for generating image data for forming a visible image by overlaying a plurality of colors including a spot color, comprising: an input section, arranged to input image data having information of colors less in number than the plurality of colors; a detector, arranged to detect two regions adjacent to each other from the input image data; and a first trapping section, arranged to perform a trapping process when a color difference of the two regions is large.

The second aspect of the present invention discloses an image processing apparatus for generating image data for forming a visible image by overlaying a plurality of colors, comprising: an input section, arranged to input image data having information of colors less in number than the plurality of colors; a detector, arranged to detect two regions adjacent to each other from the input image data; and a controller, arranged to control trapping to an adjacent portion of the two regions by determining if the two regions share a color when the color information is color-separated into the colors.

The third aspect of the present invention discloses a method of generating image data for forming a visible image by overlaying a plurality of colors including a spot color, comprising the steps of: inputting image data having information of colors less in number than the plurality of colors; detecting two regions adjacent to each other from the input image data; and performing a trapping process when a color difference of the two regions is large.

The fourth aspect of the present invention discloses a method of generating image data for forming a visible image by overlaying a plurality of colors, comprising the steps of: inputting image data having information of colors less in number than the plurality of colors; detecting two regions adjacent to each other from the input image data; and controlling trapping for an adjacent portion of the two regions by determining if the two regions share a color when the color information is color-separated into the colors.

The fifth aspect of the present invention discloses an image processing apparatus for generating image data for forming a visible image by overlaying a plurality of colors including a spot color, comprising: an input section, arranged to input image data having information of colors less in number than the plurality of colors; a detector, arranged to detect two regions adjacent to each other from the input image data; a determiner arranged to determine if colors corresponding to the two regions include a common color when image data of the two regions is color-separated into a plurality of colors including the spot color; and a trapping section, arranged to perform a trapping process for an adjacent portion of the two regions in accordance with a determination result of said determiner.

According to the present invention, image data for forming a visible image by overlaying a plurality of colors can be generated so that the purpose of the trapping process can be reflected.

Further features of the present invention will become apparent from the following description of exemplary embodiments with reference to the attached drawings.

BRIEF DESCRIPTION OF DRAWINGS

FIGS. 4 to 8 are views for explaining a trapping process;

BEST MODE FOR CARRYING OUT THE INVENTION

Image processing of an embodiment according to the present invention will be described in detail with reference to the accompanying drawings.

First Embodiment

Arrangement of Image Forming Apparatus

Figure 10:
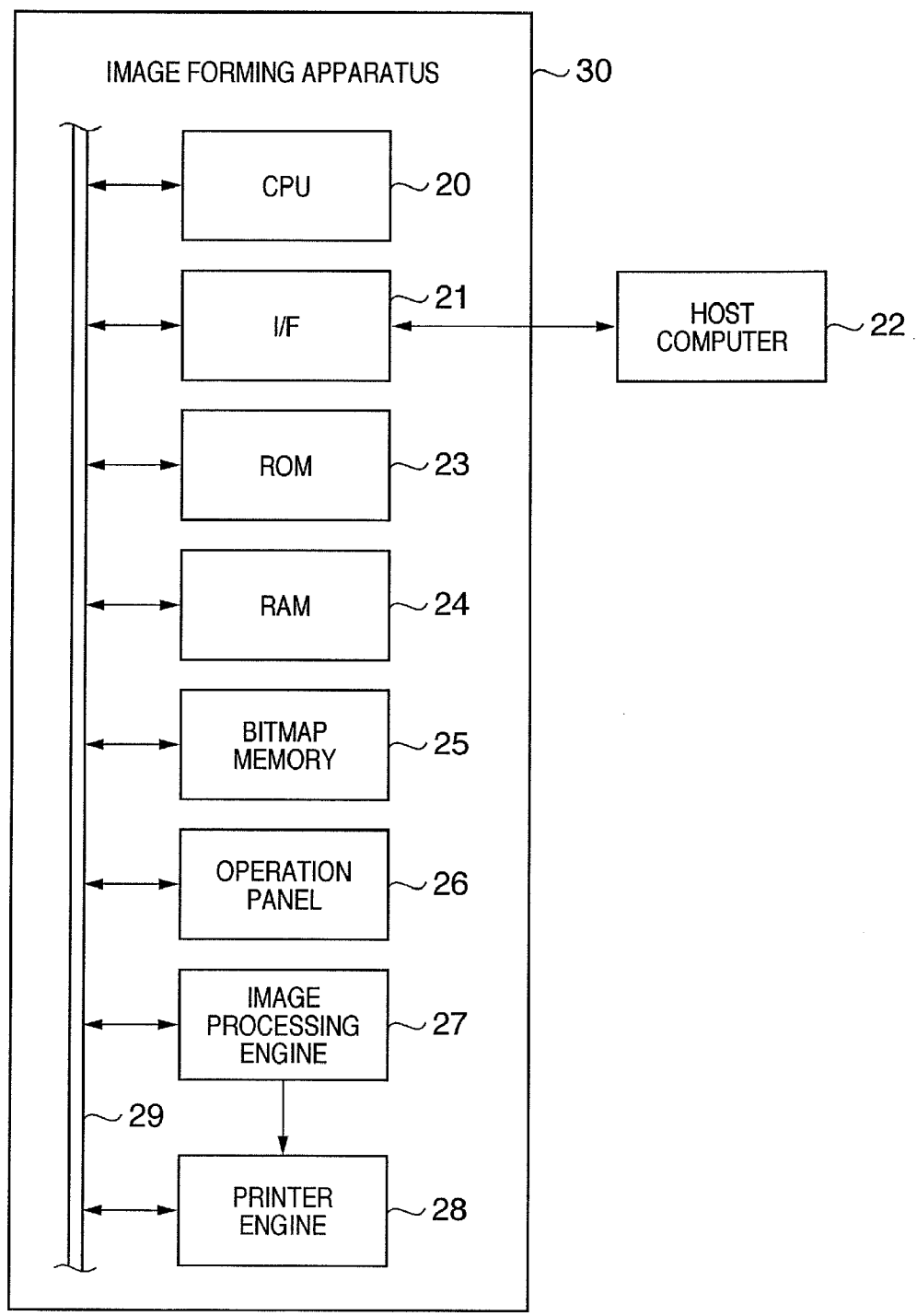
FIG. 10 is a block diagram showing the arrangement of an image forming apparatus.

FIG. 10 is a block diagram showing the arrangement of an image forming apparatus 30 of the first embodiment.

A CPU 20 executes a program stored in a ROM 23 while using a RAM 24 as a work memory, to control the overall image forming apparatus 30 through a system bus 29, and perform various processes including processes to be described later. The ROM 23 stores font data and the like in addition to the above program. The CPU 20 loads the program and data into the RAM 24 for each process. The RAM 24 is used as a buffer area of image data or the like received outside from the apparatus.

An interface (I/F) 21 communicates with a work station, personal computer, or an apparatus (host computer 22) having an image processing function, and receives image data to be processed and a control signal. The I/F 21 can use a serial interface, e.g., IEEE 1394 or USB (Universal Serial Bus), or a parallel interface such as IEEE 1384.

A bitmap memory 25 provides a storage area for rendering image data to form a visible image.

An operation panel 26 comprises keys or a touch panel to input an instruction to the image forming apparatus 30 by a user, and an indicator or liquid crystal monitor to display the detection result of the state of the image forming apparatus 30 by the CPU 20.

An image processing engine 27 performs rendering to generate image data for forming a visible image on a printing medium while using the bitmap memory 25 as a work memory, and generates color data including spot colors in addition to CMYK (color separation processing). The color data is output to a printer engine 28. The printer engine 28 forms, in accordance with a control of the CPU 20, a visible image on a printing medium by overlaying colors on the basis of the input color data. The spot colors include light cyan (LC), light magenta (LM), and gray (Gy) of light colors; red (R), green (G), blue (B), orange (O), violet (V) of the hue system; and the like.

[Arrangement of Printing System]

Figure 11:
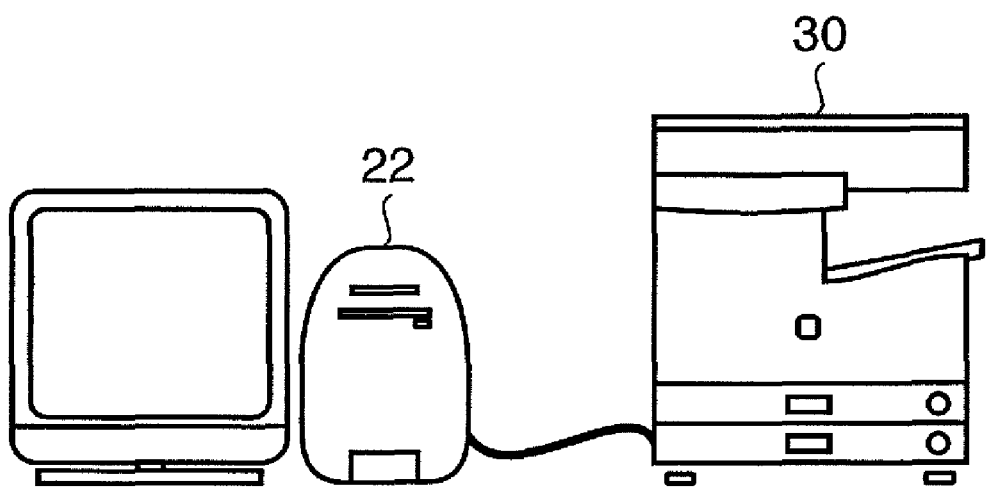
FIGS. 11 and 12 are views showing the arrangement of a printing system assumed in the embodiment.
Figure 12:
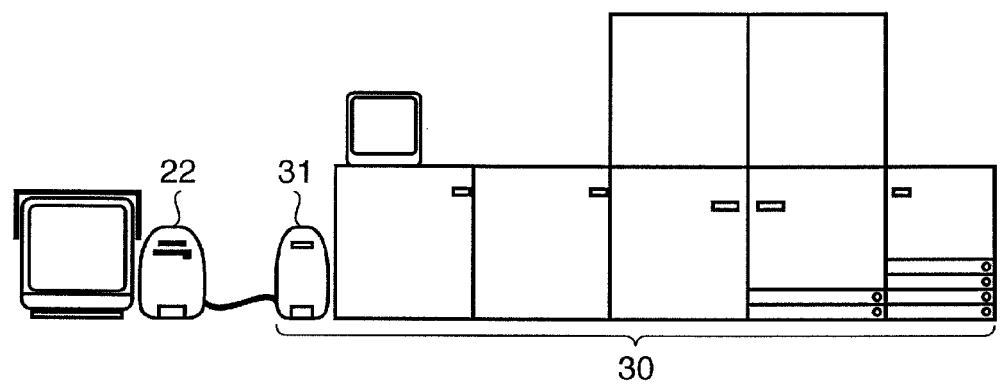

FIGS. 11 and 12 are views showing the arrangement of a printing system assumed in the embodiment. FIG. 11 shows an example in which the host computer 22 is connected to the image forming apparatus 30 such as a multi-functional peripheral apparatus or printer. FIG. 12 shows an example in which the host computer 22 is connected to the image forming apparatus 30 such as a printing machine including an apparatus 31 having an image processing function.

The host computer 22 generates PDL data on the basis of the generated, edited, and processed image data, and transmits the PDL data to the image forming apparatus 30 together with other control information. The CPU 20 of the image forming apparatus 30 interprets the received PDL data, converts the interpreted PDL data into intermediate data for rendering having outlines of respective objects as path data, and performs image processing such as color matching. The CPU 20 then sends the intermediate data after image processing and the control information to the image processing engine 27. The image processing engine 27 renders the intermediate data to raster data corresponding to each color in accordance with the control information.

Figure 9:
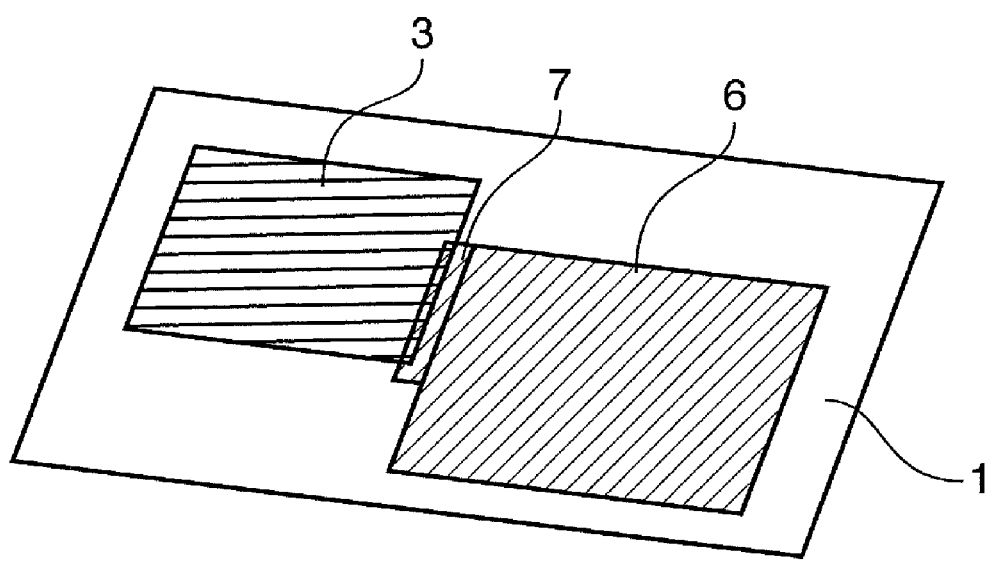
FIG. 9 is a view for explaining a trapping process of an embodiment.

In image processing to be described below, the intermediate data, control information, or intermediate data and control information are processed, and, for example, a trap region 7 is generated. As shown in FIG. 9, the trap region 7 reduces a blank portion even when misregistration of any colors of regions 3 and 6 takes place.

[Image Processing]

Figure 13:
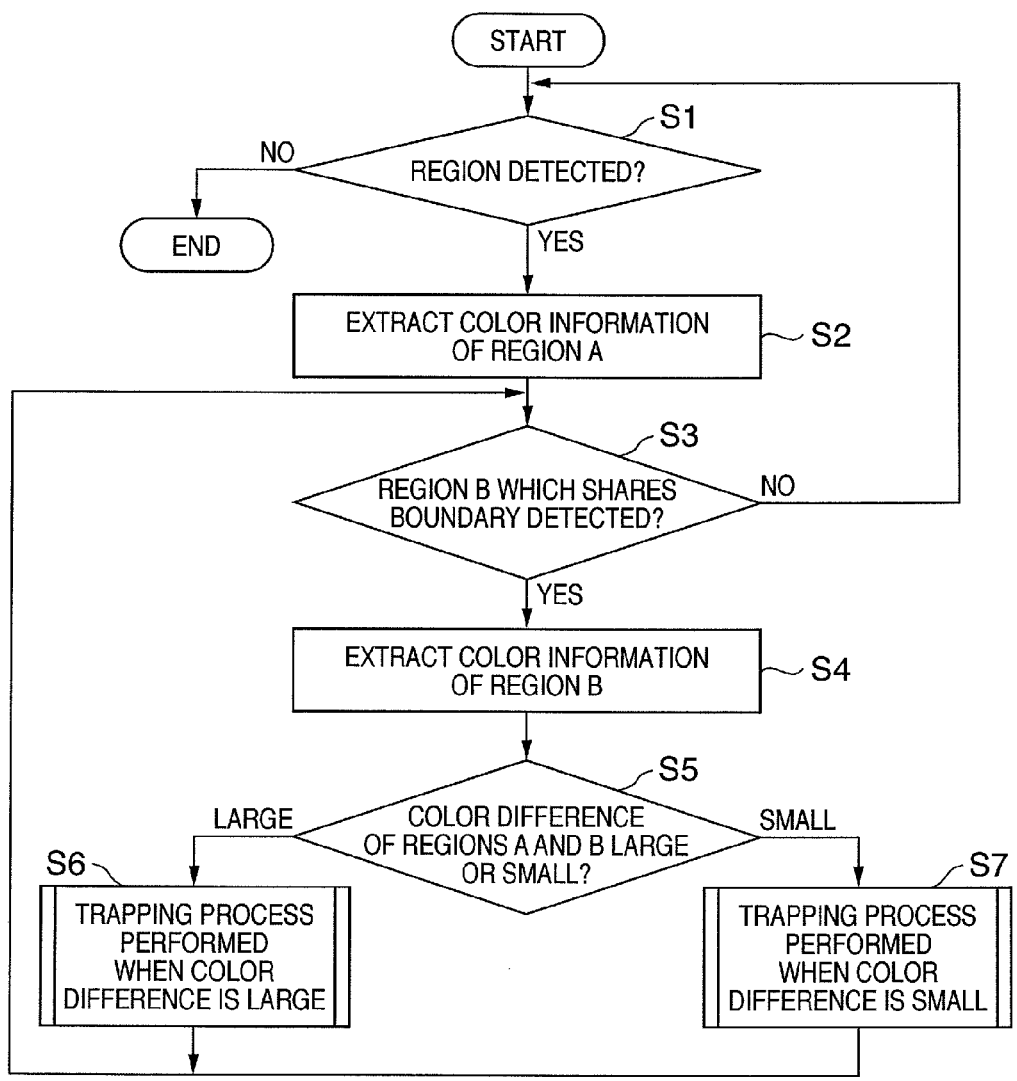
FIG. 13 is a flowchart for explaining the trapping process of the embodiment.

FIG. 13 is a flowchart for explaining the trapping process of the first embodiment. The CPU 20 or image processing engine 27 performs this process, or the CPU 20 and image processing engine 27 perform this process in corporation with each other. Note that misregistration of a color is caused by an imperfect arrangement of the color, imperfect formation of a visible image, imperfect transportation of a printing medium in the image forming apparatus 30, or the like.

First, a region is detected from the intermediate data (S1). A region means an image portion (object) having an area and of the same or sufficiently similar color. A gradation portion in which the tint continuously changes is divided into fine regions (subdivision) in advance, and converted into groups of regions in which the tint gradually changes.

When the region is detected, color information of the region is extracted form an intermediate code (S2). Then, an undetected region (to be referred to as a region B) which shares a boundary with the detected region (to be referred to as a region A) (in other words, which is adjacent to the region A) is detected (S3). If no region B exists, the process returns to step S1.

When the region B is detected, the color information is extracted from an intermediate code of the region B (S4), the colors of the regions A and B are compared (S5), and the trapping process performed when the color difference is large (S6) or the trapping process performed when the color difference is small (S7) is performed.

Magnitude determination of the color difference is performed on the basis of the following equation. When all color information of C, M, Y, and K satisfy the following equation, the regions A and B are unlikely to use the same color. Accordingly, the color difference is determined to be large. On the other hand, if any one of C, M, Y, and K does not satisfy the following equation, the regions A and B are likely to use the same color. Accordingly, the color difference is determined to be small.

$$|dA-dB|/d \geqq th \tag{1}$$

where dA is the density of any one of C, M, Y, and K of the region A, dB is the density of any one of C, M, Y, and K of the region B, if (dA s dB) then d=dA else d=dB, and th is a predetermined threshold.

The processes in steps S2 to S7 are repeated until no new region is detected in the determination in step S1.

Trapping Process when Color Difference is Large

Figure 14:
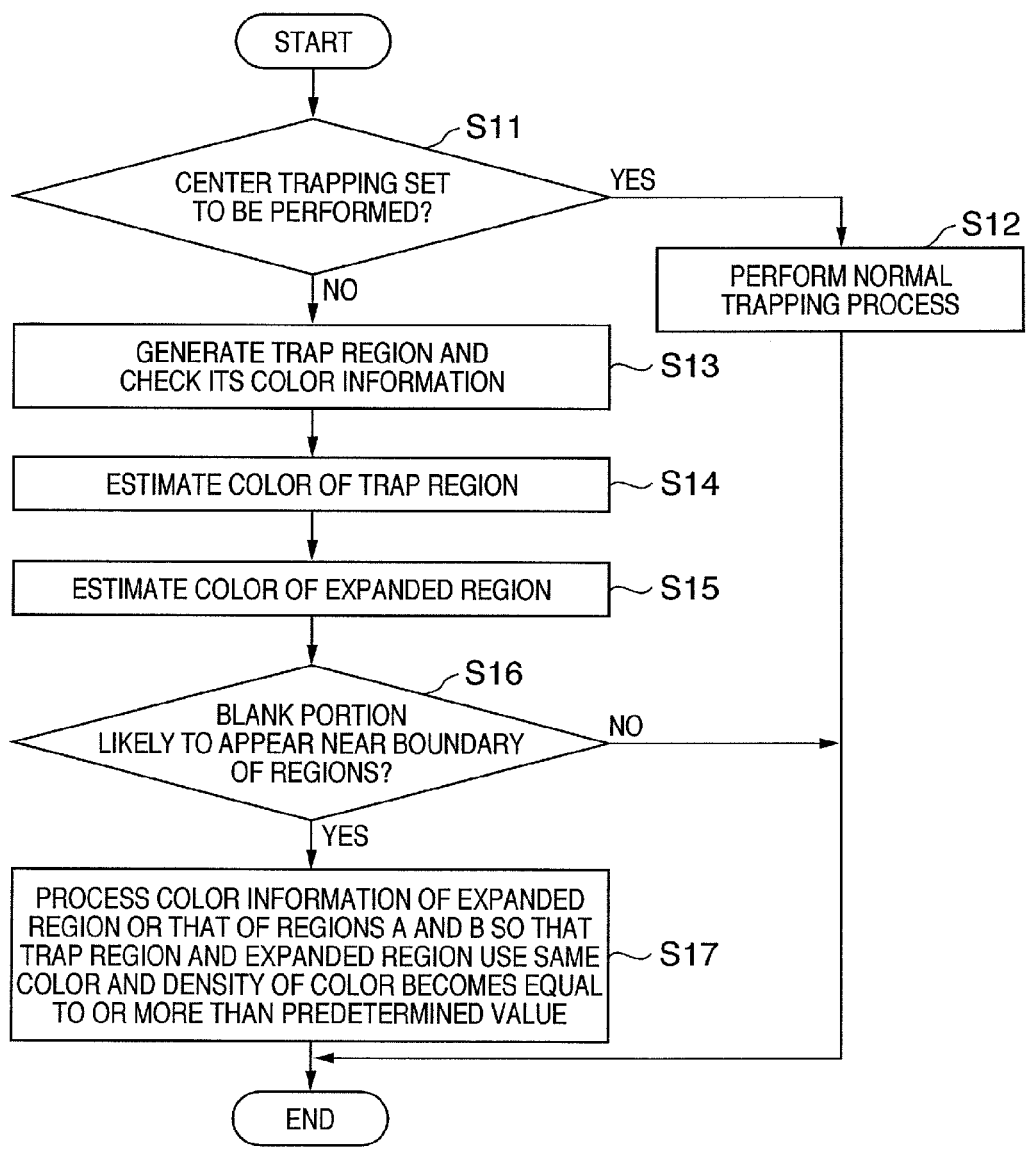
FIG. 14 is a flowchart for explaining the trapping process performed when a color difference is large.

FIG. 14 is a flowchart for explaining the trapping process (S6) performed when a color difference is large.

Figure 18:
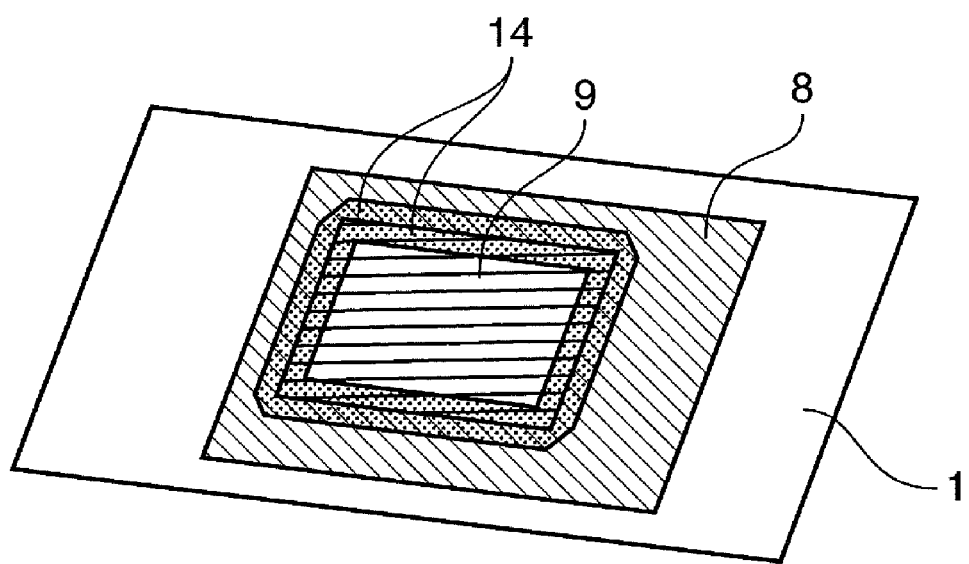

First, it is decided if center trapping is set to be performed or not (S11). Center trapping generates a trap region 14 which covers the boundary of regions 8 and 9, as shown in FIG. 18.

When center trapping is set to be performed, general center trapping is performed (S12).

Figure 1:
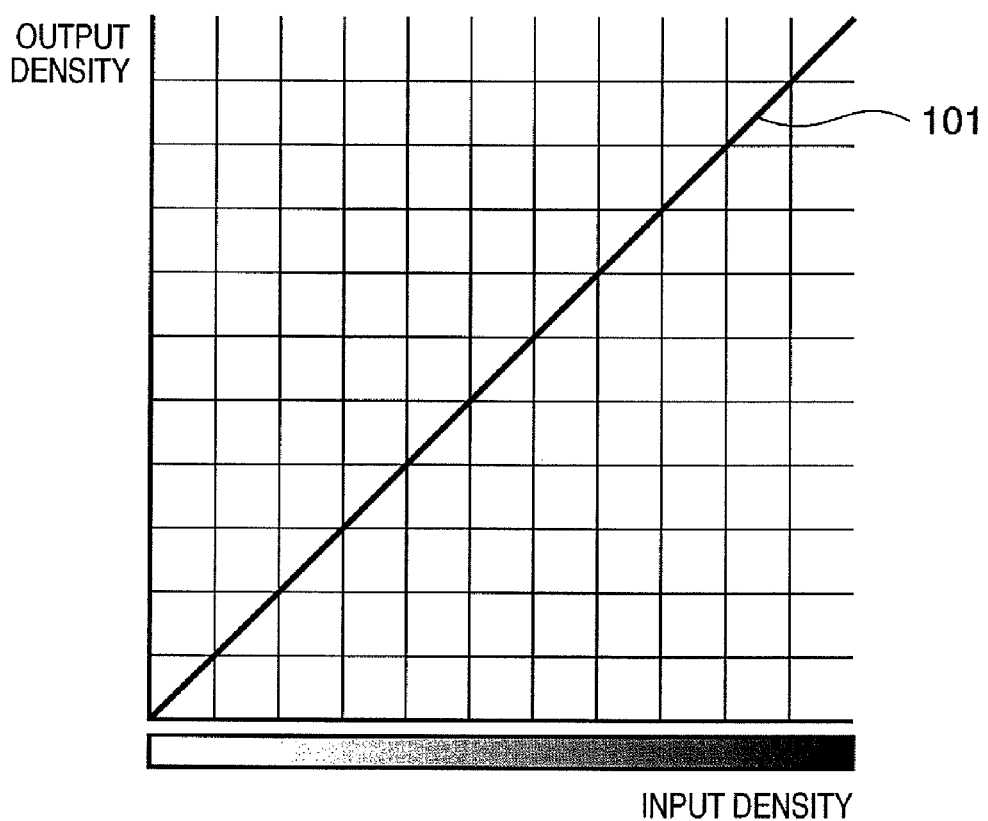
FIGS. 1 to 3 are graphs for explaining generation of colors for forming an image.
Figure 2:
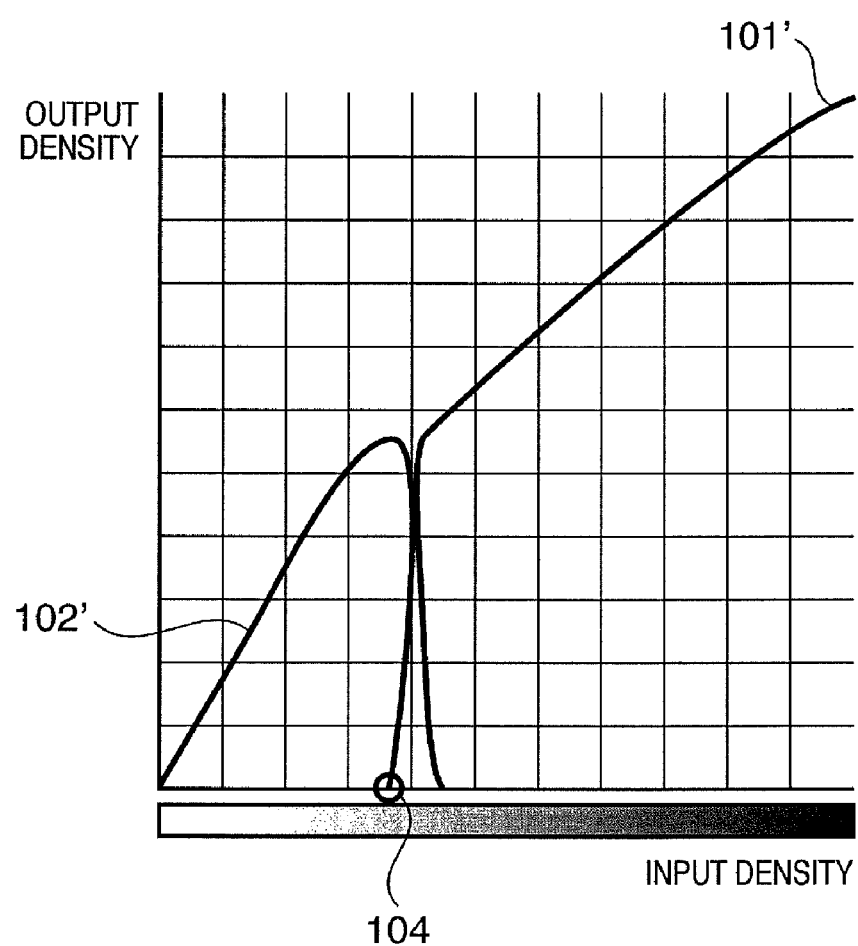
Figure 3:
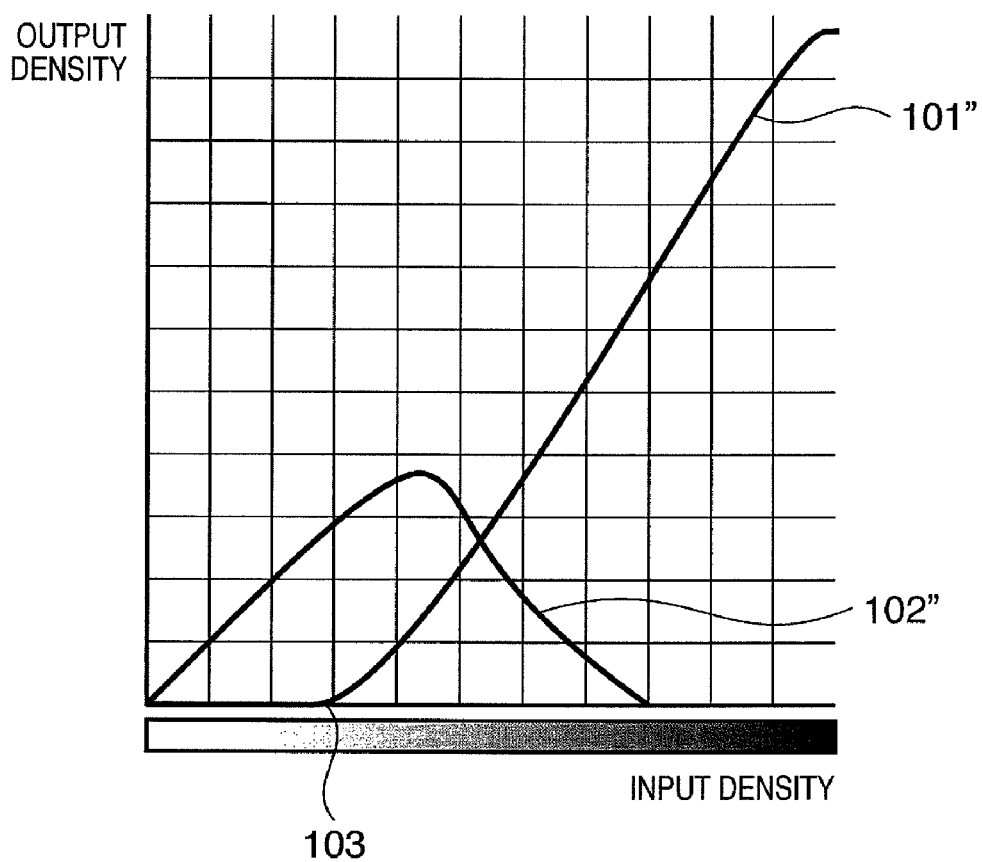
Figure 4:
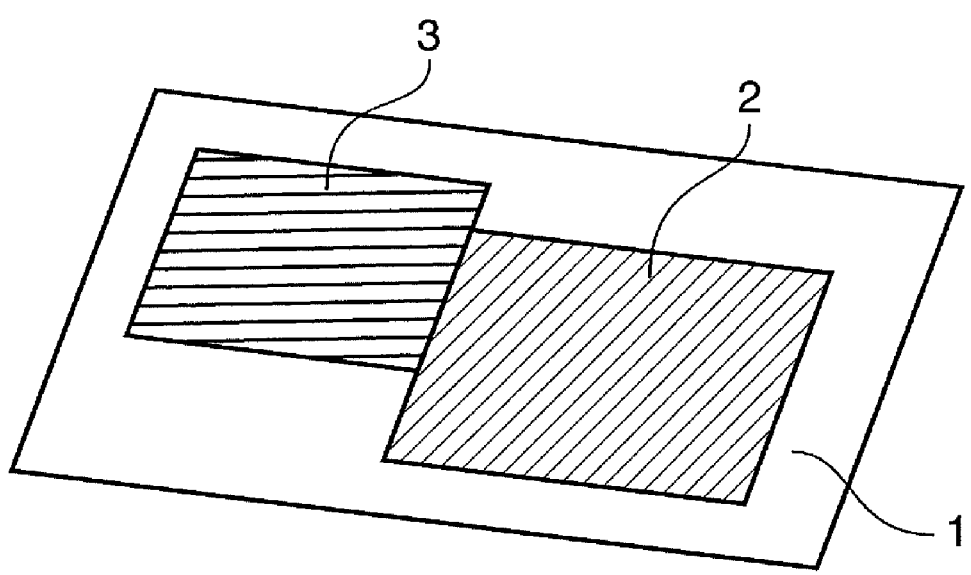
Figure 5:
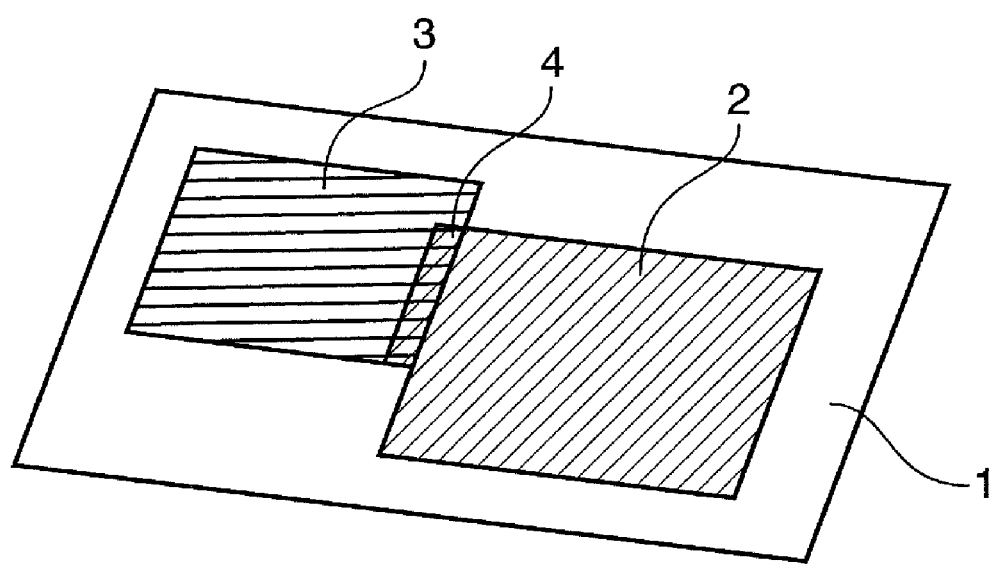
Figure 6:
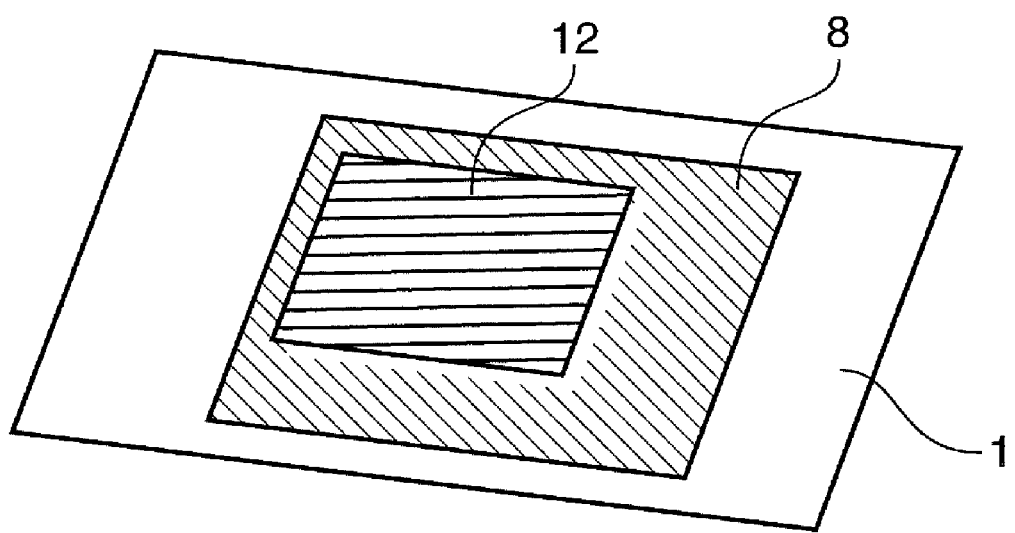
Figure 7:
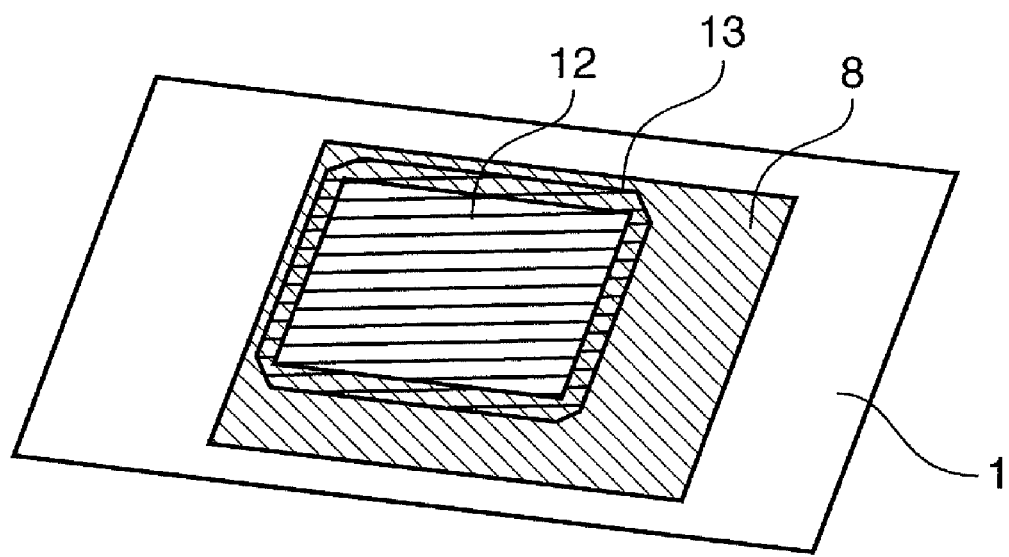
Figure 15:
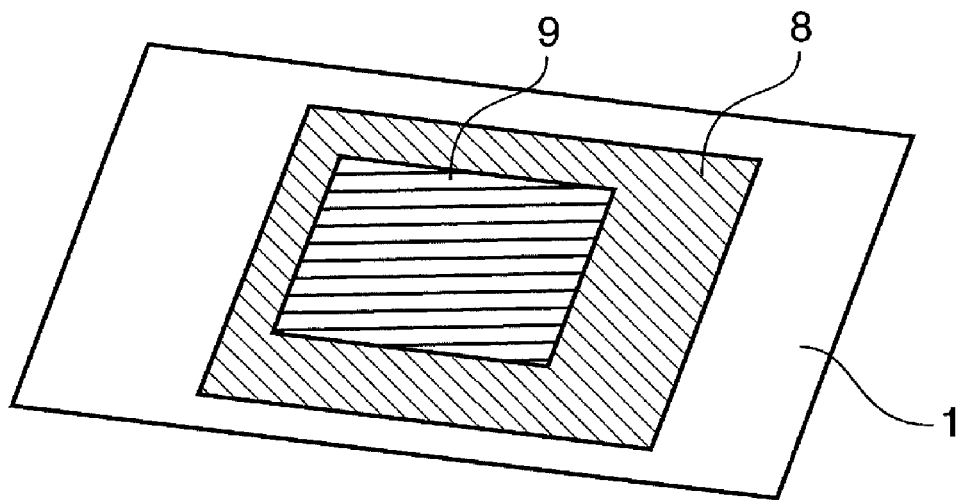
FIGS. 15 to 18 are views for explaining a generation method of a center trapping and trapping region.
Figure 16:
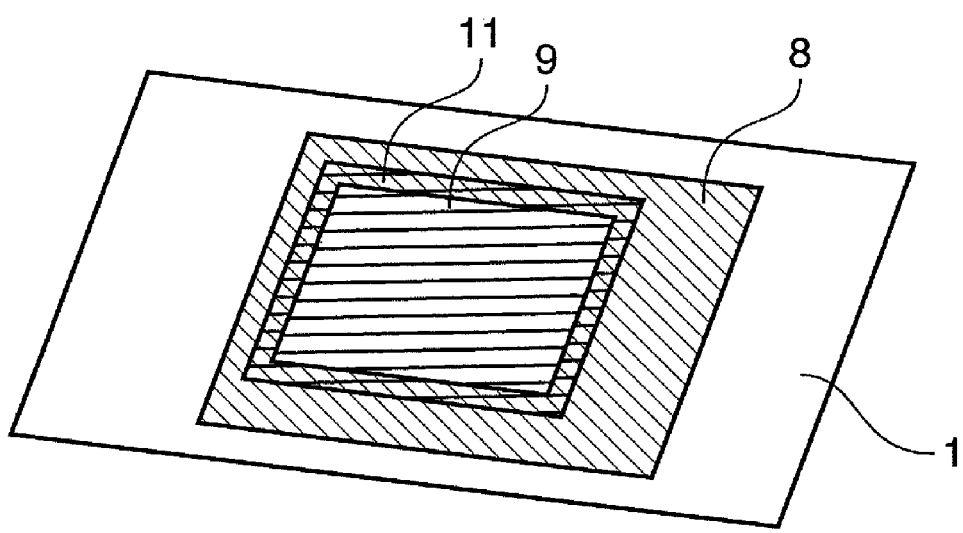
Figure 17:
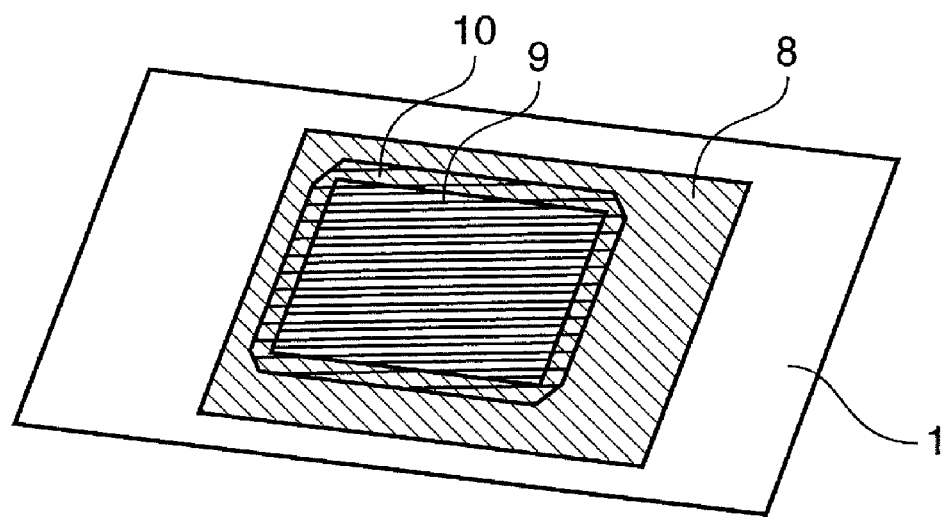

When a trapping process other than center trapping is performed for an image shown in FIG. 15, a trap region 11 is generated in an inner region 9 as shown in FIG. 16 (choke trap), or a trap region 10 is generated in an outer region 8 as shown in FIG. 17 (spread trap). When no center trapping is set to be performed, a trap region (such as the regions 11 and 10 shown in FIGS. 16 and 17) to be generated by a trapping process is generated, the color information of the trap region is checked (S13), and the color of the trap region is estimated (S14). More specifically, the CPU 20 refers to a color separation lookup table (LUT) of the image processing engine 27 which converts (color-separates) image data into color data, and estimates the color of the trap region. The color separation LUT describes, for each value of an input density, a given color material (e.g., a light-cyan color material) as well as a dark color material of the same color system (e.g., a dark-cyan color material) to be used for printing as shown in FIGS. 2 and 3.

A trap region is generated so as to share a color of regions A and B. Assume that the region A has C+M (mixed color of cyan and magenta) and the region B has C (cyan alone), then the trap region is generated to have C. When the region A has M and the region B has C, the trap region is generated to have C M. Accordingly, a four-color (CMYK) printing system can readily estimate the colors from CMYK data without referring to the color separation LUT.

In a printing system which uses colors including spot colors, however, CMYK data is replaced by the colors of the spot colors. Upon this replacement, a color C is sometimes completely replaced by a color light cyan (color LC) (in other words, the value of the color C becomes 0) when the color C exists but has low density. For example, when a curve 101" of FIG. 3 represents the reproduction characteristics of the color C, the color C having an input density of an Input density 103 or less is replaced by the color LC alone. Assume that CMYK data is separated into seven colors of C, M, Y, K, LC, LM (light magenta), and G (green). In this case, even when the CMYK data has C data corresponding to the color C, the color C may be replaced by the colors LC and G upon the color separation. Referring to the color separation LUT, a replacement condition from C to LC (the critical density value of C above which C is not replaced by LC) can be determined. Of course, other replacement conditions to replace other colors by the corresponding spot colors upon color-separating CMYK data can also be determined. Therefore, replacement of CMYK data with spot colors can be estimated by referring to the color separation LUT.

In the printing system shown in FIG. 12, the apparatus 31 having the image processing function obtains the color separation LUT from the image forming apparatus (printing machine) 30 in advance and estimates the colors. The color separation LUT can be installed to the apparatus 31 together with a printer driver of the printing machine 30 upon installing the printer driver, or the color separation LUT can be transferred from the printing machine 30 to the apparatus 31.

Next, the color of a region (to be referred to as an "expanded region" hereinafter, which corresponds to the region 8 in FIG. 16, the region 9 in FIG. 17, and the region A or B) to be expanded by the trapping process is estimated (S15) as in step S14. Then the color estimated in step S14 is compared with that estimated in step S15. When misregistration occurs, if a blank portion is likely to appear near the boundary (adjacent portion) of the regions A and B is determined (S16).

When two regions (the trap region and expanded region in this case) which overlap or are adjacent to each other share a color including a spot color, no blank portion appears even if misregistration of the color occurs. Therefore, the degree of image quality drop which occurs near the boundary (adjacent portion) of the regions A and B can be determined to be small, and the necessity of the trapping process can be determined to be low. This determination is executed in step S16.

When it is determined that no blank portion appears, the generated trap region is deleted and the process is terminated.

When it is determined that a blank portion may appear, on the basis of the estimation of the colors using the above-described LUT, the color information of the expanded region or that of the both regions A and B is processed (S17). More specifically, the density of the color information (one or a plurality of C, M, Y, and K) is adjusted so that the trap region and expanded region use the same color and the density of the color becomes equal to or more than a predetermined value in color separation processing. Note that, the predetermined value described-above is a threshold density at which no blank portion visually appears.

As an example, a case wherein, e.g., a light color is used as a spot color will be described below. The density of the trap region is set to the density at which the light color and dark color are mixed. As a result, the trap region has both light and dark colors, and no blank portion appears. Alternatively, when it is estimated that the trap region is reproduced by the light color alone and the expanded region is reproduced by the dark color, the trap region is converted so as to have a density at which the dark color is used. For example, referring to FIG. 3, when the trap region has a density lower than the input density 103 and the light color is used for the trap region, the density of the trap region is converted into a density slightly higher than that of the input density 103 (at which the dark color is used).

Trapping Process when Color Difference is Small

Figure 19:
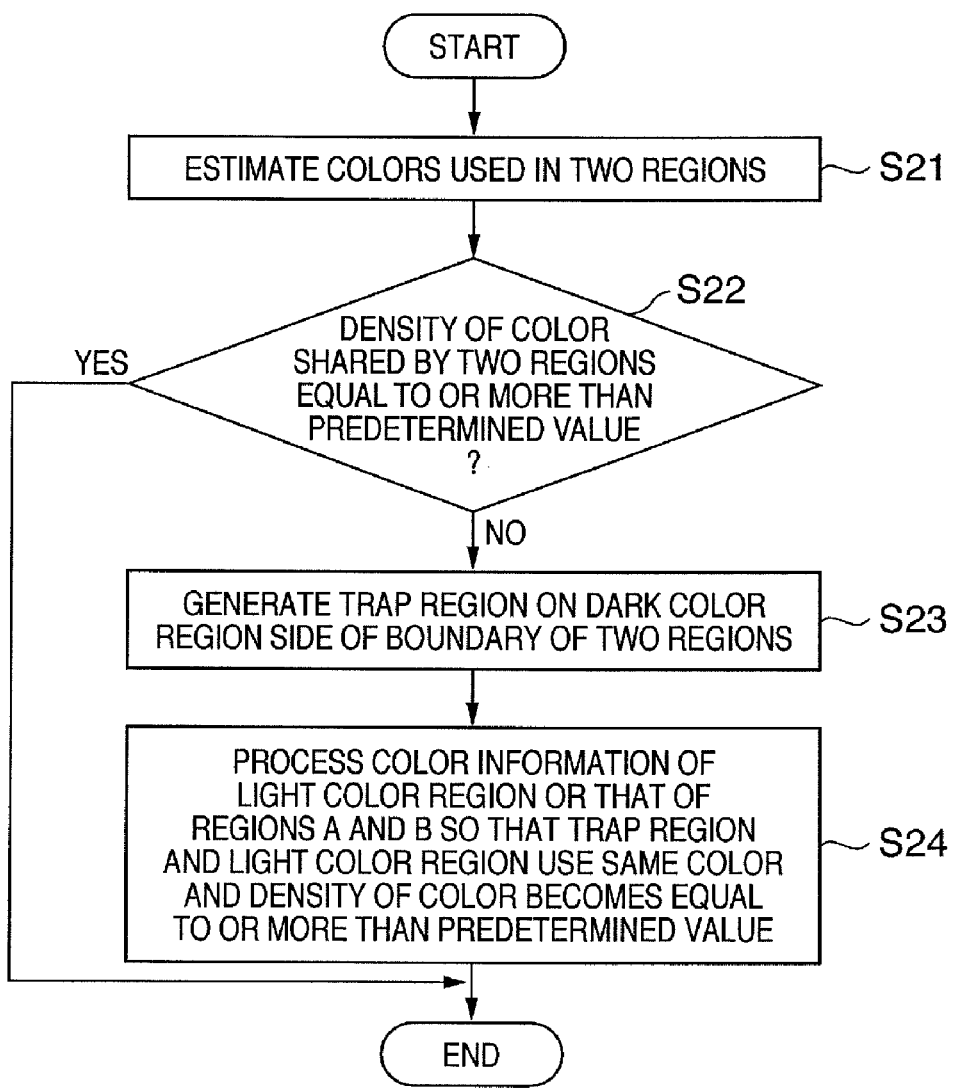
FIG. 19 is a flowchart for explaining the trapping process performed when the color difference is small.

FIG. 19 is a flowchart for explaining the trapping process (S7) performed when the color difference is small.

First, a color shared by the regions A and B is estimated using the above-described LUT (S21), and it is determined if the density of the shared color is smaller than the predetermined value (S22).

If the color difference of the regions A and B which share a boundary (are adjacent to each other) is small, it is considered that the regions A and B use the same color (e.g., color cyan has a value in the two regions). Therefore, when the density of the shared color becomes equal to or more than the predetermined value, no blank portion appears even when misregistration of a given color including the spot colors occurs. Accordingly, the degree of an image quality drop which occurs near the boundary (adjacent portion) of the regions A and B can be determined to be small, and the necessity of a trapping process can be determined to be low. In order to determine this, a determination in step S22 is executed. Note that an ND value or an estimated density value is used as a criterion of determination in step S22.

When it is determined that no blank portion appears, the process is terminated.

When it is determined that a blank portion may appear, a trap region is generated on the region side having the dark color (to be referred to as a "dark color region" hereinafter) of the boundary (adjacent portion) of the regions A and B (S23). That is, the region having the light color (to be referred to as a "light color region" hereinafter) becomes the expanded region. In a normal trapping process, no trapping process is performed when the color difference of the regions A and B is smaller than the predetermined value. However, in the first embodiment, the trap region is generated on the dark color region side.

On the basis of the color estimation using the above-described LUT, the color information of the both regions A and B is processed (S24). More specifically, in color separation processing, the density of the color information (one or a plurality of C, M, Y, and K) is adjusted so that the trap region and light color region use the same color and the density of the color becomes equal to or more than the predetermined value.

As an example, a case wherein, e.g., a light color is used as a spot color will be described below. The density of the dark color region is kept unchanged or decreased within the range in which the color is not replaced by the light color, and the density of the light color in the trap region is set equal to or smaller than that of the light color in the light color region. As a result, the trap region and light color region have the same light color, and no blank portion appears between the regions A and B even when misregistration occurs.

In this manner, when an image to be formed has two regions the boundaries of which are shared (adjacent) and the color difference of which is large, and when the two regions are estimated not to use the same color, the following processing will be performed. That is, the color information of the expanded region or that of the trap and expanded regions is processed so that the trap region and expanded region use the same color and the color density becomes equal to or more than the predetermined value.

When an image to be formed has two regions the boundaries of which are shared (adjacent) and the color difference of which is small, and when the two regions use the same color but the color density is smaller that the predetermined value, the following processing will be performed. That is, the color information of the light color region or that of the light color region and dark color region is processed so that a trap region is generated in the dark color region. The trap region is generated to use the same color as in the light color region and have a color density equal to or more than the predetermined value.

In this manner, when forming an image using the colors of the spot colors, generation of an unintended trap region can be prevented, and a blank portion due to color misregistration can be prevented.

Modification of Embodiment

In the trapping processes performed when the color difference is large and small shown in FIGS. 14 and 19, an example of processing the color information of the regions A and B in order to set the color of the trap region after color separation processing has been described. However, a blank portion can be prevented by generating a trap region so as to have the color information indicating that the trap region uses the same color as the expanded region and the density of the color becomes equal to or more than the predetermined value.

Figure 20:
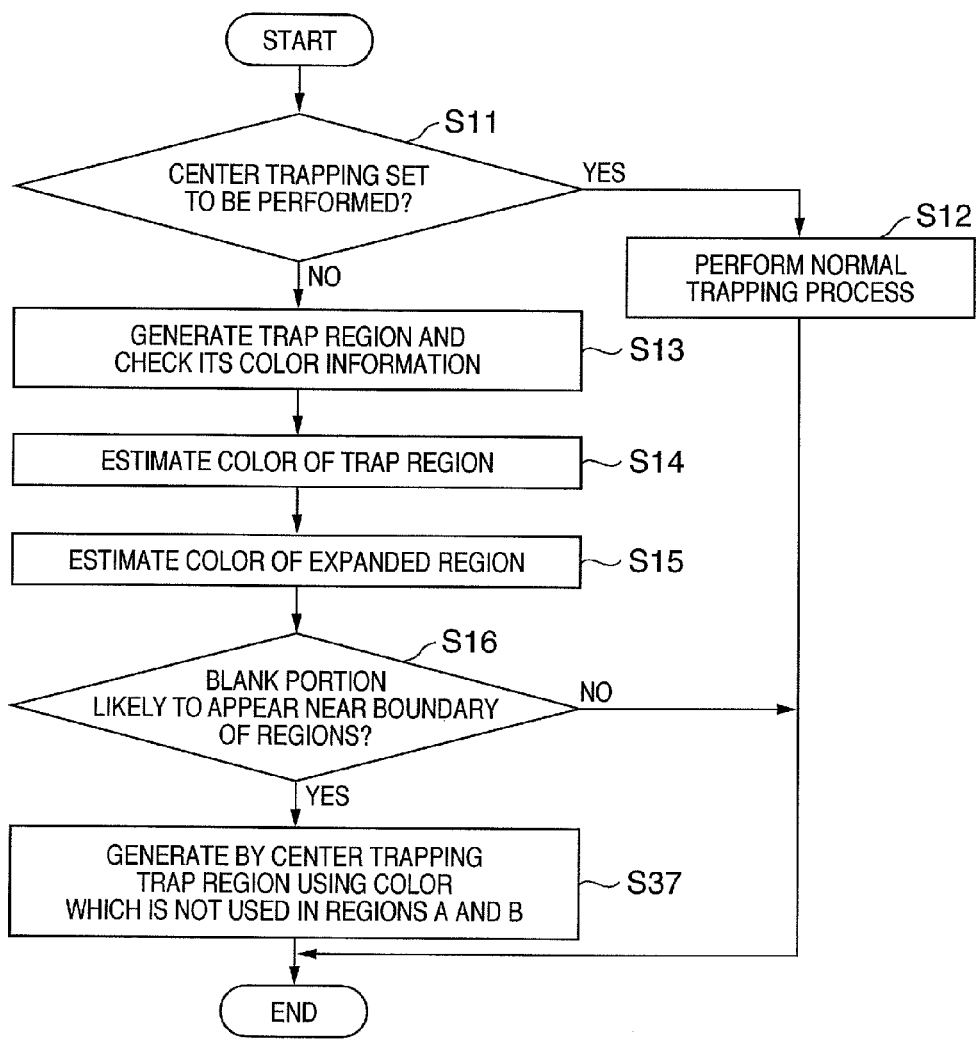
FIGS. 20 to 22 are flowcharts showing modifications of the trapping process performed when the color difference is large.

FIG. 20 is a flowchart showing an example of the trapping process (S6) performed when the color difference is large, in which the same processes as in FIG. 14 are performed except step S37. More specifically, when a blank portion may appear, a trap region using a color which neither region A nor B uses is generated by center trapping (S37). For example, in the case of M+LM, center trapping using a fluorescent pink, or the like is performed.

Figure 21:
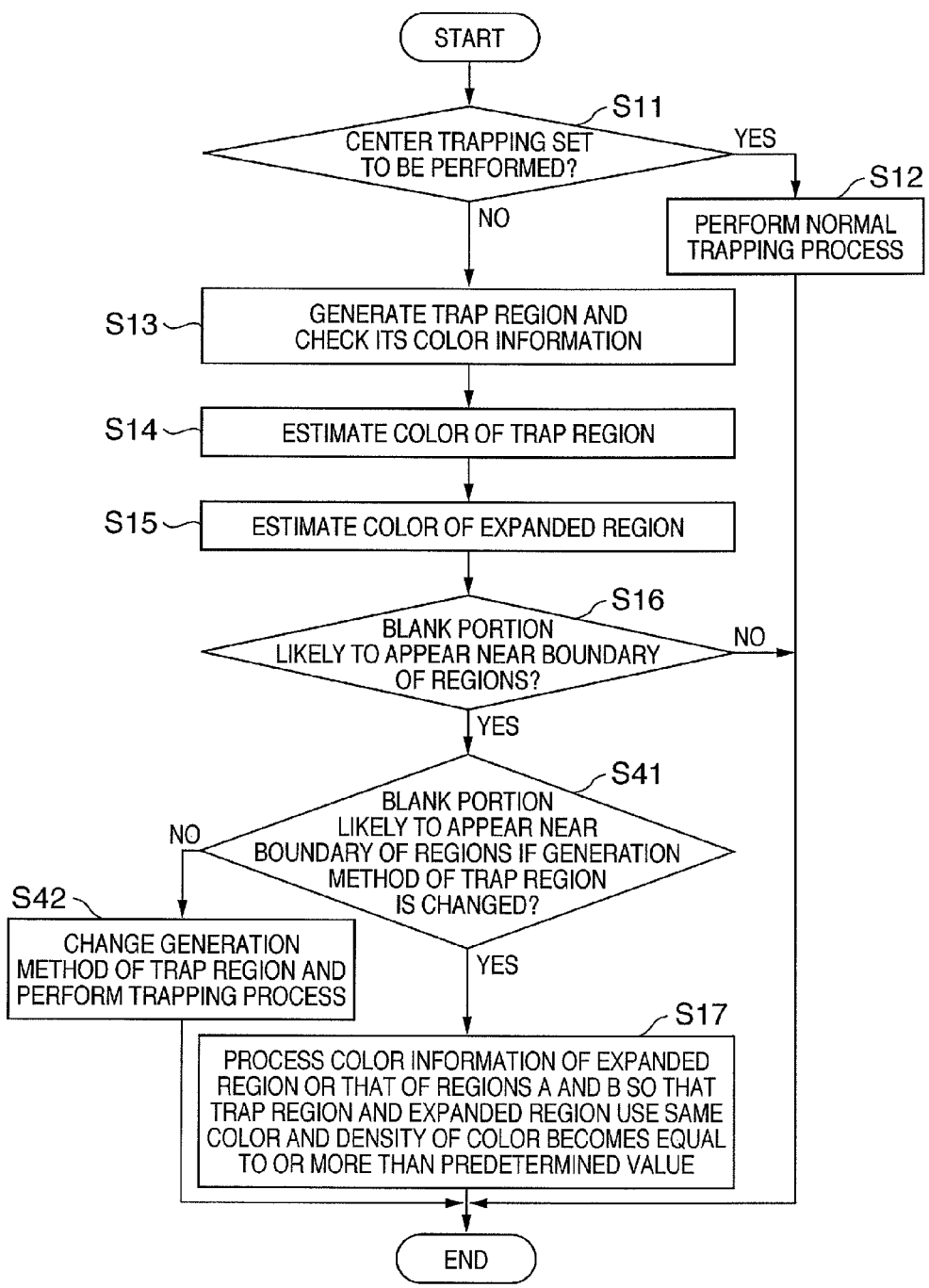

FIG. 21 is a flowchart showing an example of the trapping process (S6) performed when the color difference is large, in which the processes in steps S11 to S17 are the same as in FIG. 14.

When a blank portion may appear, it is determined if a blank portion may appear due to misregistration of a given color including the spot colors when the methods (choke trap shown in FIG. 16 and spread trap shown in FIG. 17) of generating a trap region in the regions A and B are reversed. That is, the generation method of the trap region is changed and steps S13 to S16 are executed.

When it is determined that no blank portion appears by changing the generation method of the trap region, the generation method of the trap region is changed and the trapping process is performed (S42). When it is determined that a blank portion appears even if the generation method of the trap region is changed, the process in step S17 is performed.

Figure 22:
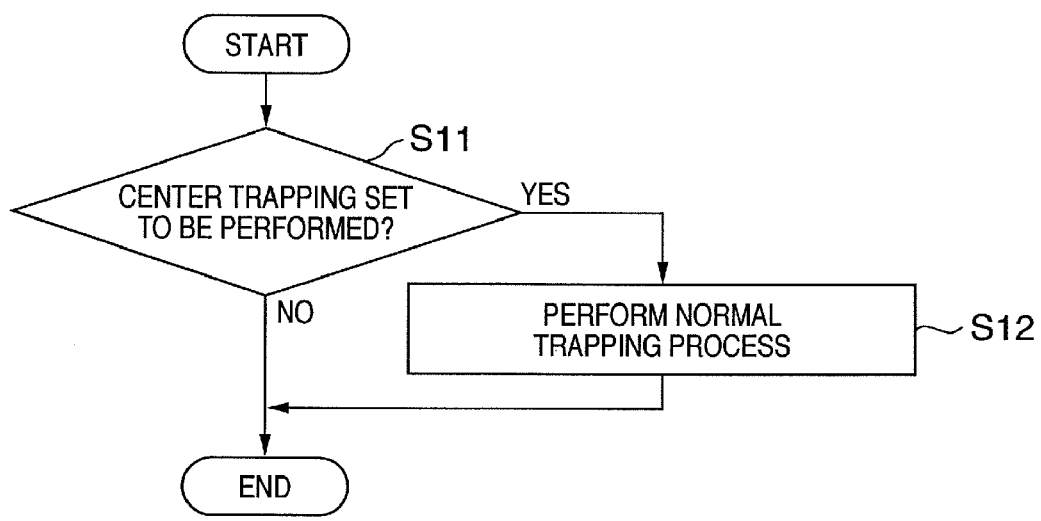

FIG. 22 is a flowchart showing an example of the trapping process (S6) performed when the color difference is large, wherein the processes in steps S11 and S12 are the same as in FIG. 14. In this case, when no center trapping is performed, no trapping process is performed. In other words, the rapping process is given up.

A user may select and set processing in FIG. 14, 20, 21, or 22 to be performed.

This embodiment includes a case wherein the above-described trapping process is implemented by processing PDL data and accompanying information without obtaining intermediate data and the above-described function is implemented by this processing.

The trapping process described above can be performed by any one of the host computer 22, image forming apparatus 30, apparatus 31 connected to a printing machine and having an image processing function.

The host computer 22 shown in FIGS. 11 and 12 may be connected to the image forming apparatus 30 through a network. The present invention can be applied to a case wherein the image forming apparatus 30 obtains image data from a server connected to the network and forms an image from the obtained image data.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-254005, filed Sep. 1, 2005, which is hereby incorporated by reference herein in its entirety.

The invention claimed is:

1. An image processing apparatus for generating image data for forming a visible image by overlaying a plurality of colors including cyan, magenta, yellow, black and another spot color using a lookup table which shows replacement conditions from the cyan, the magenta, the yellow and the black indicated by the image data to the other spot color, comprising:
    an input section, constructed to input image data having information of colors less in number than the plurality of colors;
    a detector, constructed to detect two regions adjacent to each other from the input image data;
    a trapping section, constructed to perform a trapping process when a difference between colors of the two regions equals or exceeds a predetermined threshold value;
    a first estimator, constructed to estimate colors after a color of a trap region generated by the trapping process is separated, with reference to the lookup table to color-separate the image data inputted by the input section into the plurality of colors including the cyan, the magenta, the yellow, the black and the other spot color;
    a second estimator, constructed to estimate colors after a color in a region which expands due to the generation of the trap region is separated, with reference to the lookup table;
    a determiner, constructed to determine if a background color appears near an adjacent portion of the two regions due to misregistration based on a comparison of the colors estimated by the first and second estimators;
    a color processor, constructed, in a case where the determiner determines that the background color appears, to process the image data so that the trapping region and the expanded region have a common color when the trapping region and the expanded region are color-separated using the lookup table; and
    a converter, constructed to convert the processed image data into image data corresponding to the plurality of colors including the cyan, the magenta, the yellow, the black and the other spot color using the lookup table.

2. The apparatus according to claim 1, wherein the color processor processes the image data by processing the estimated color of the expanded region or the colors of the two regions so that the trap region and the expanded region have the common color and a density of the common color becomes equal to or more than a predetermined value when the determiner determines that the background color appears.

3. A method of generating image data for forming a visible image by overlaying a plurality of colors including cyan, magenta, yellow, black and another spot color using a lookup table which shows replacement conditions from the cyan, the magenta, the yellow and the black indicated by the image data to the other spot color, comprising:
    using a processor to perform the steps of:
    inputting image data having information of colors less in number than the plurality of colors;
    detecting two regions adjacent to each other from the input image data;
    performing a trapping process when a difference between colors of the two regions equals or exceeds a predetermined threshold value;
    estimating colors after a color of a trap region generated by a trapping process is separated, with reference to the lookup table to color-separate the image data inputted in the inputting step into the plurality of colors including the cyan, the magenta, the yellow, the black, and the other spot color;
    estimating colors after a color in a region which expands due to the generation of the trap region is separated, with reference to the lookup table;
    determining if a background color appears near an adjacent portion of the two regions due to misregistration based on a comparison of the colors estimated in the first and second estimating steps;
    processing, in a case where it is determined in the determining step that the background color appears, the image data so that the trapping region and the expanded region have a common color when the trapping region and the expanded region are color-separated using the lookup table; and
    converting the processed image data into image data corresponding to the plurality of colors including the cyan, the magenta, the yellow, the black and the other spot color using the lookup table.

4. A non-transitory computer-readable medium storing a computer-executable program for causing a computer to perform a method of generating image data for forming a visible image by overlaying a plurality of colors including cyan, magenta, yellow, black and another spot color using a lookup table which shows replacement conditions from the cyan, the magenta, the yellow and the black indicated by the image data to the other spot color, the method comprising the steps of:
    inputting image data having information of colors less in number than the plurality of colors;
    detecting two regions adjacent to each other from the input image data;
    performing a trapping process when a difference between colors of the two regions equals or exceeds a predetermined threshold value;
    estimating colors after a color of a trap region generated by a trapping process is separated, with reference to the lookup table to color-separate the image data inputted in the inputting step into the plurality of colors including the cyan, the magenta, the yellow, the black, and the other spot color;
    estimating colors after a color in a region which expands due to the generation of the trap region is separated, with reference to the lookup table;
    determining if a background color appears near an adjacent portion of the two regions due to misregistration based on a comparison of the colors estimated in the first and second estimating steps;
    processing, in a case where it is determined in the determining step that the background color appears, the image data so that the trapping region and the expanded region have a common color when the trapping region and the expanded region are color-separated using the lookup table; and
    converting the processed image data into image data corresponding to the plurality of colors including the cyan, the magenta, the yellow, the black and the other spot color using the lookup table.

5. The apparatus according to claim 1, wherein the plurality of colors includes light cyan as the other spot color.

* * * * *